United States Patent
Perry

(10) Patent No.: US 8,043,647 B1
(45) Date of Patent: Oct. 25, 2011

(54) SUGAR REPLACEMENT

(76) Inventor: Stephen C. Perry, Longwood, FL (US)

(*) Notice: Subject to any disclaimer, the term of this patent is extended or adjusted under 35 U.S.C. 154(b) by 889 days.

(21) Appl. No.: 10/249,014

(22) Filed: Mar. 10, 2003

(51) Int. Cl.
*A23C 1/236* (2006.01)

(52) U.S. Cl. .................................... 426/548

(58) Field of Classification Search .............. 426/548, 426/615, 658
See application file for complete search history.

(56) References Cited

U.S. PATENT DOCUMENTS

| | | | |
|---|---|---|---|
| 4,695,629 A | 9/1987 | Clauss et al. | |
| 6,264,999 B1 * | 7/2001 | Yatka et al. | 426/3 |

FOREIGN PATENT DOCUMENTS

| | | | |
|---|---|---|---|
| JP | 2001-321114 | * | 11/2001 |
| JP | 2002-51723 | * | 2/2002 |

OTHER PUBLICATIONS

Schiffman et al, Investigation of Synergism in Binary Mixtures of Sweeteners, Brain Research Bulletin, 1995, vol. 38, No. 2, pp. 105-120.*
Schiffman et al., Synergism among Ternary Mixtures of Fourteen Sweeteners, Chem. Senses 25:131-140, 2000.*
Deis, R.C., Sweetners for Health Foods, Food Product Design: Feb. 2001.*

* cited by examiner

*Primary Examiner* — Leslie Wong
(74) *Attorney, Agent, or Firm* — Malin Haley DiMaggio Bowen & Lhota, P. A.

(57) ABSTRACT

The invention is a low calorie sugar substitute suitable for use as a sugar replacement, including use in activities such as baking and cooking. It is a combination of an intense sweetener and a bulking agent. The intense sweetener is acesulfame potassium. The bulking agent is either erythritol or a mixture of gluco-mannitol and gluco-sorbitol. Preferably the ratio of intense sweetener to the bulking agent is in the range of 0.20 to 0.35 percent by weight.

4 Claims, No Drawings

SUGAR REPLACEMENT

BACKGROUND OF INVENTION

1. Field of the Invention

The invention relates to a low calorie sweetener, diabetically safe substitute suitable for use as a sugar replacement, including use in activities such as baking, cooking and general sweetening of foods and beverages.

2. Description of Related Art

Sugar refers to a family of simple carbohydrates found naturally in fruits, vegetables, grains and dairy products. It is also added to foods as a sweetener or preservative. Added sugars and naturally occurring sugars are chemically identical. Common table sugar has been used for centuries for adding to foods to sweeten them. Common table sugar is a disaccharide called sucrose. A disaccharide is a sugar which, upon hydrolysis, yields two monosaccharide molecules. Sucrose consists of the sugars glucose and fructose. Glucose and fructose are monomeric sugars. Each has the chemical formula $C(6)H(12)O(6)$. However, the molecules are arranged in slightly different ways. Glucose has a six-membered ring and fructose has a five-membered ring. Sucrose consists of one molecule of glucose and one molecule of fructose joined together in a glycosidic linkage. The linkage is formed with the loss of one O and 2H, or more accurately, with the loss of a water molecule, H2O.

The use of low calorie sweeteners, such as intense or potent sweeteners, as a replacement for table sugar in a variety of food products is common in food and beverage formulations. For many consumers, however, products marketed as diet or light versions of products that are artificially sweetened are not preferred. Furthermore, the sugar substitutes that are currently on the market have unsatisfactory, look, feel and taste characteristics. Attempts have been made over the years to improve the taste delivery of these diet or light products and sugar substitutes. Besides sweetness, other health related and sensory characteristics of a food or beverage product, including the healthiness for a human being, effect on diabetics, flavor, mouthfeel and aftertaste of the product, affect the desirability of an artificial sweetener. Efforts have been made to add specific bulking agents to intense sweeteners in an attempt to improve the health benefits and the sensory delivery of sugar substitutes and to provide the same physical and aesthetic characteristics as sugar.

One of the sensory limitations of current sugar substitutes often expressed by consumers is the lack of proper look, density and mouthfeel that they deliver relative to their equivalents. The full calorie products are perceived as having a full taste and smooth mouthfeel. Diet products are often described as tasting artificial and having an unpleasant aftertaste.

Low-calorie potent sweeteners generally permit the development of diet or light products through an ability to elicit sufficient sweetness at a very low concentration of the sweetener, but they are generally unable to mimic other sensory characteristics of sucrose, particularly density, taste, mouthfeel and body. For example, the granularity of current sugar substitutes are completely different from common table sugar. In addition, artificial sweeteners to date have not been able to deliver the full, rounded, sweetness typical of sucrose. Accordingly, there is a continuing need to identify a low-calorie sweetener that provides both the sweetness characteristics of sucrose and other important sensory characteristics such as mouthfeel, flavor, aftertaste and visual characteristics.

SUMMARY OF INVENTION

This invention relates to combinations of sweeteners including an intense sweetener in combination with one or more bulking agents for use in the sweetening of prepared foods as well as the preparation of foods in general. Acesulfame potassium is a white, odorless, free flowing crystalline powder which is chemically a potassium salt of 6-methyl-1,2,3-oxathiazin-4(3H)-one-dioxide, described in U.S. Pat. No. 4,695,629 to Clauss, et al., and is well known in the art as an intense sweetener with a taste profile very similar to common table sugar. This substance is approximately 200 times sweeter than sugar and is calorie-free. It is widely used in food products. The powder is highly stable under ordinary conditions, having a long shelf life. It also does not break down when cooked or baked. The present invention cooks like sucrose, and bakes like sugar allowing for bake safe foods for diabetics. In addition, it is also very soluble in water, a characteristic highly sought-after in an artificial sweetener. The present invention is a diabetically safe sugar substitute.

When used in combination with specific bulking agents, acesulfame potassium can be used to form a good-tasting sweetener that shares many important characteristics with sucrose, including the taste profile. The effect is especially made with a mixture of two disaccharide alcohols, such as gluco-mannitol and gluco-sorbitol. Alternatively, a polyol such as erythritol may be mixed with acesulfame potassium to form an artificial sweetener with the advantageous characteristics.

In proper proportions, the use of a mixture of gluco-mannitol and gluco-sorbitol with acesulfame potassium is highly advantageous. The mixture of gluco-mannitol and gluco-sorbitol provides an excellent tasting bulking agent. It helps provide an artificial sweetener with the same volume, texture and appearance of sugar. Gluco-mannitol and gluco-sorbitol are currently used in a wide variety of products. They are non-cariogenic and low glycemic. These substances do not promote dental caries (cavities). The taste stimulates saliva to neutralize other oral acids. Erythritol also has these beneficial characteristics for a bulking agent to the acesulfame potassium.

In alternate embodiments of the invention, the acesulfame potassium which is used as the super sweetener or super sweetening agent is replaced by one of the following compositions. In a first embodiment, stevia which is a plant extract which is approximately 200 times sweeter than table sugar may be substituted for the acesulfame potassium. Lo Han Kuo (*mormodica grosvenorii*) is a plant extract which is approximately 250 times sweeter than sucrose may be substituted. Also alternate embodiments mabinlang (*capparis masaikai*) a plant extract can be used; sucralose, a processed sucrose, can be used; thaumatin (*thaumatococcus daniellii*) a plant extract may be used; and brazzein (*pentadiplandra brazzana*), a plant extract may be used. A person skilled in the art will be able to use each of these ingredients independently as a super sweetener or sweetening agent in combination with the bulking agents as taught in this invention.

It is an object of this invention to provide a good-tasting artificial sweetener with the visual, density, taste and weight characteristics of table sugar.

In accordance with this object and other objects which will become apparent hereinafter, the instant invention will now be described.

DETAILED DESCRIPTION

Synergistic combinations of sweeteners including acesulfame potassium can be obtained by using about 0.20 to 0.35 percent by weight acesulfame potassium in combination with a specific bulking agent. In the preferred embodiment approximately 0.27 percent by weight acesulfame potassium is used to best replicate the taste of table sugar.

Any of a number of bulking agents may be used in combination with the acesulfame potassium. In one embodiment, a mixture of two (2) disaccharide alcohols is used. In the preferred embodiment, the disaccharide alcohols are gluco-mannitol and gluco-sorbitol. Preferably, the disaccharide alcohols to be used are easily available and low in caloric value. Furthermore, it is preferred that the disaccharide alcohols are non-cariogenic and low glycemic so that the sweetener is less likely to cause tooth decay and to affect blood glucose levels. Also, it is preferred that the bulking agent is white, crystalline and odorless, so that the resulting sweetener provides as realistic a sugar substitute as possible.

In an alternative embodiment, a polyol, or sugar alcohol, such as erythritol is used as a bulking agent with the acesulfame potassium. Erythritol is preferred because it has a very low caloric content. Also, erythritol is rapidly absorbed in the lower intestine, so it has high digestive tolerance. In addition, since erythritol is a sugar alcohol that does not affect blood serum glucose or insulin levels, it is safe for people with diabetes. Furthermore, the preferred use with acesulfame potassium as a sugar substitute can be obtained by using about 0.20 up to 0.35 percent by weight acesulfame potassium in combination with a erythritol. In the preferred embodiment approximately 0.20 percent by weight acesulfame potassium us used to best replicate the taste of table sugar.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A diabetically-safe sugar substitute, comprising:
   a composition including a mixture of acesulfame potassium; and a bulking agent being a mixture of gluco-mannitol and gluco-sorbitol;
   and wherein the ratio of the acesulfame potassium to the mixture of gluco-mannitol and gluco-sorbitol is in the range of 0.20 to 0.35 percent by weight in a mixture to be used as a sugar substitute; said sugar substitute having a taste, texture, mouth feel and visual appearance of sugar.

2. The artificial sweetener of claim 1, wherein the ratio of the acesulfame potassium to the mixture is approximately 0.27 percent by weight.

3. The sugar substitute of claim 1, wherein acesulfame potassium is replaced with one of the following natural plant extract sweeteners, the substitute sweetener selected being included at a percent by weight equivalent to that used for the acesulfame potassium:
   Stevia (extract of *Stevia rebaudiana*);
   thaumatin;
   Lo Han Kuo (extract of *Mormodica grosvenorii*);
   Mabinlang (extract of *Capparis masaikai*); or
   Brazzein (extract of *Pentadiplandra brazzana*).

4. A low calorie sugar replacement composition that is safe for diabetics and that looks like sugar and can be used in activities such as baking, cooking and general sweetening of food and beverages, said sugar substitute having approximately the same texture, taste, mouth feel and density as table sugar, said sugar substitute comprising:
   acesulfame potassium; and
   a bulking agent comprising erythritol, the ratio acesulfame potassium to the erythritol is in the range of 0.20 to 0.35 percent by weight.

* * * * *